Oct. 23, 1928.
C. B. MILLS
1,688,825
THRUST BEARING FOR GYRO COMPASS ROTORS
Filed Sept. 28, 1920
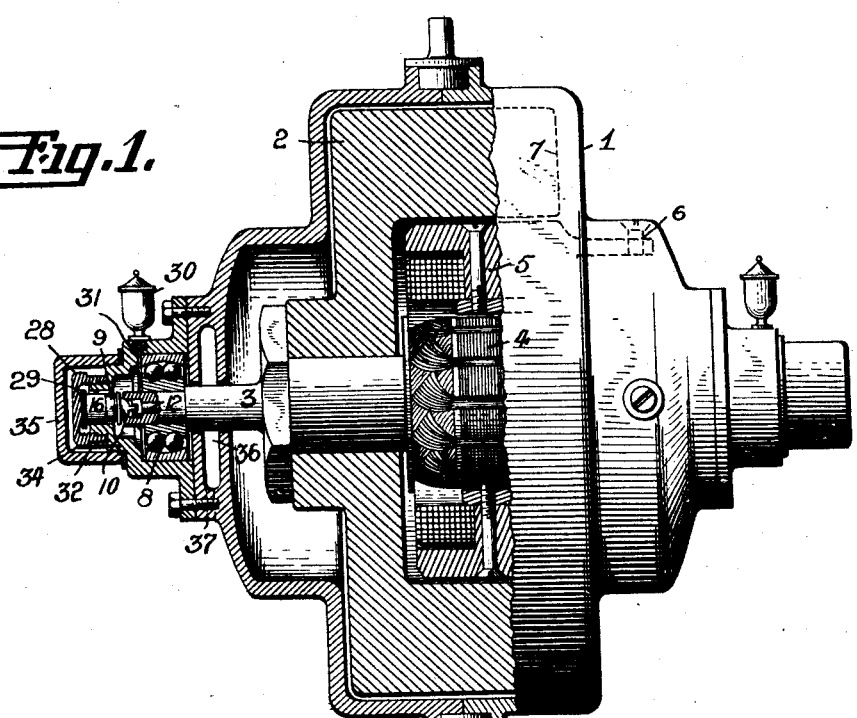
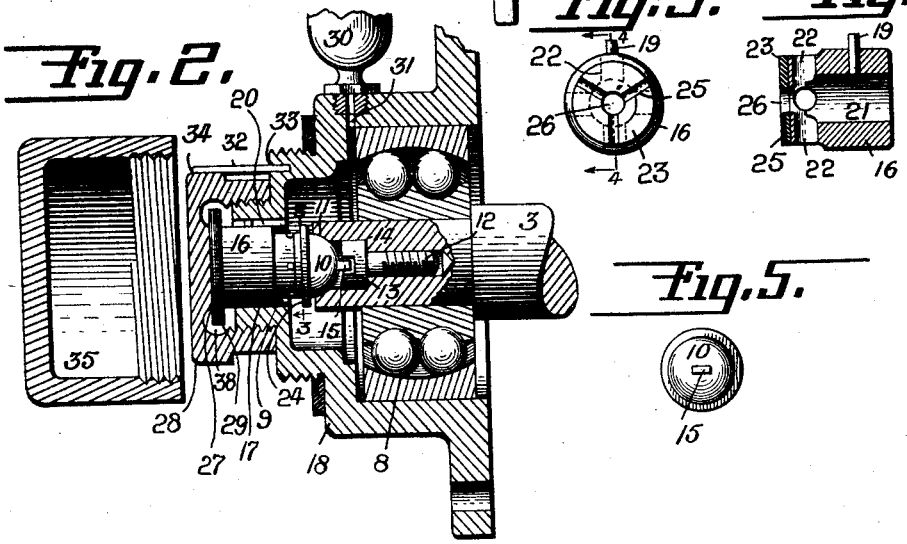
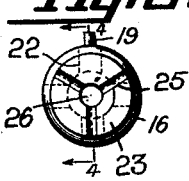
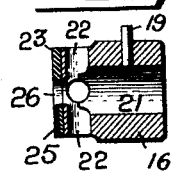
Inventor
CHESTER B. MILLS
By his Attorney
Herbert H. Thompson Patented Oct. 23, 1928.

1,688,825

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

THRUST BEARING FOR GYRO-COMPASS ROTORS.

Application filed September 28, 1920. Serial No. 413,312.

This invention relates to gyroscopic compasses, and more particularly to thrust bearings for keeping the rotor centralized within the casing during operation.

There are several factors which tend to decentralize the rotor during operation. Variations in the current used for running the rotor tend to thrust the rotor to one side or the other so that it becomes necessary to provide means for counteracting this tendency.

Also changes in temperature cause expansion and contraction of the various parts of the instrument at different rates so that certain parts expand away from others. Thus the casing carrying one element of the trust bearing expands away from the other element carried by the rotor shaft, causing a gap and permitting the rotor to move axially, when the compass becomes inclined, unbalancing the entire sensitive element.

The object of this invention then is to devise a method and means for maintaining the parts of the sensitive element in their proper relative positions, and more specifically to prevent axial movements of the rotor within the casing when unequal expansion of the rotor shaft and the casing occurs.

Referring to the drawings wherein I have shown what I now consider to be the preferred form of my invention:

Fig. 1 is a side elevation partly in section of a gyro compass rotor and casing.

Fig. 2 is an enlarged sectional detail of one end of the rotor shaft and casing showing the radial and thrust bearings.

Fig. 3 is an end view of one of the thrust bearing elements taken on line 3—3 of Fig. 2.

Fig. 4 is a section taken on line 4—4 of Fig. 3.

Fig. 5 is a rear view of a thrust bearing element.

In the drawings 1 represents the gyro casing, 2 the rotor, and 3 the shaft on which the rotor is fixed. The casing 1 is supported by the trunnions shown for oscillation about a horizontal axis at right angles to the rotor axis. The rotor may be actuated by either direct or alternating current. In the present instance I have shown the direct current structure wherein the armature 4 of the driving motor is fixed on shaft 3 and the field 5 is fixed to the casing 1 at 6. The rim of the rotor may extend over the field in the manner indicated by dotted lines 7. Further details of this construction will not be necessary as they do not constitute any part of the invention.

The shaft 3 may be mounted for rotation in any suitable radial bearings 8. In order to prevent end thrust so that the rotor and casing may be kept in their proper relative positions to maintain the unit perfectly balanced I may employ a thrust bearing 9 (see also Fig. 2), at each end of shaft 3. As both ends of said shaft and its bearings and mountings are alike only one end is shown in detail.

The construction of thrust bearing 9 is as follows: A hemispherical member 10 of any suitable material may fit adjustably into a correspondingly shaped seat 11 in the end of shaft 3. A screw 12 having the usual slot 13 in its head may be screwed into the end of the shaft with its head sunken in as shown in the recess 14 in the end of the shaft. A flat sided projection 15 may be provided on the hemispherical member 10 reaching into slot 13 so that rotation of shaft 3 will cause rotation of said member. The fixed portion 16 of the thrust bearing is mounted in an opening 17 in the end portion 18 of the gyro casing 2 and is capable of sliding longitudinally through said opening. A pin 19 fixed in said bearing portion 16 may be provided to project into a groove 20 in the casing so as to prevent rotation of said bearing portion within the casing without preventing longitudinal movement. As shown in Figs. 3 and 4, the portion 16 may be hollow as at 21 and provided with radial holes 22 from the outside to said hollow interior. On one end of the portion 16 is Babbitt or other suitable bearing metal 23 against which the bearing surface 24 of the hemispherical member 10 bears. The bearing surface of the babbitt 23 may be provided with oiling grooves 25 radiating from the central opening at 26.

Between the rear end of portion 16 and the inner wall 27 of the end cap 28 are provided a plurality, that is, a large number of very thin metallic discs 29, the discs being placed face to face so as to form a pack as shown and fitted somewhat snugly between the portion 16 and cap 28. While the disks are shown as centralized with respect to the member 16, they will, of course, sink down into the reservoir 38 and rest on the bottom thereof. It is to be noted however, that the cap is so constructed and the reservoir is so shallow, that the disks can move very little from their centralized position and the slight decentralization thus permitted cannot affect the operation of the disks.

Any suitable means such as an oil cup 30 may be provided to supply oil to the bearings; the oil being permitted to trickle down through the small passage 31 to the inner walls of the bearing end of the casing to spread to bearings 8, and after accumulating slightly in the lower part of the bearings, flow over into the trap chamber 36 from where it may be drawn off or permitted to run out through an opening 37. By this method the oil will be prevented from running into that portion of the casing containing the rotor. The oil will also spread over the surface of the bearing portion 16 and into holes 22. Suction caused by rotation of member 10 will draw the oil through opening 26 and the grooves 25 in the babbitt 23 and thus effect the lubrication of the thrust bearing 9. Seepage of oil will also result in the moistening of the discs 29 and will serve to keep said discs constantly moist, or a quantity of oil may be supplied to the reservoir 38 when the parts are assembled and seepage of oil into said reservoir may serve to compensate for any slight dissipation of the original supply.

The oil on the discs 29 will by reason of capillary attraction have a tendency to spread between the several discs, and in fact will so spread that a thin oil film will exist between the discs. The thickness of the film will vary slightly in accordance with the pressure tending to press the discs together. Since the disks dip into oil, they may be said to be maintained in a saturated condition at all times, although the amount of oil between the disks varies with the pressure conditions. Thus, when expansion of the several parts of the gyroscope takes place, and the casing 2 expands to a greater degree than shaft 3 so that the two elements 10 and 16 of the thrust bearing tend to separate the pressure upon the discs lessens and the thickness of the oil films between the discs increases by reason of the inflow of oil due to capillarity. This spreads the several discs apart with sufficient pressure to hold the bearing surfaces 23 and 24 firmly together. Conversely, when the several parts of the gyroscope contract the oil will be pressed out from between the discs to compensate for the difference in the degree of contraction between the elements. The pack of discs 29 then acts in the capacity of a spring to hold the stationary and rotatable elements 16 and 10 of the thrust bearing 9 in contact with each other. And as this takes place at both ends of shaft 3 with an extremely high degree of accuracy the rotor 2 is maintained in a perfectly centralized position with respect to its casing and the balance of the entire unit remains unchanged. The pack of disks 29 and the fluid thus form in effect a fluid expanding device or means for supplying fluid pressure.

It will be seen that by reason of the ball and socket connection between the bearing element 10 and the shaft 3 the bearing surface 24 may maintain perfect contact with its cooperating element 23, any tendency to wabble being consumed by play of element 10 in the socket 11.

In adjusting or centralizing the rotor after the parts have been assembled and to apply the proper pressure to the discs 29 the cap 28 may be adjusted by screwing it to right or left on the end portion 18 of casing 1. A spring 32 fixed in the casing at 33 may be provided to engage the knurled edge 34 of cap 28 to hold said cap in any position to which it may be adjusted. An outer cap 35 may be provided to enclose the adjustable cap 28 as shown in Fig. 1.

Having described my invention, what I claim and desire to secure by Letters Patent is:

1. The combination, a rotatable element, a stationary thrust bearing associated therewith, a limited stop, a plurality of discs positioned between said bearing and said stop, and a reservoir containing fluid, said discs being positioned in said reservoir whereby interstices between said discs are maintained saturated.

2. Means for preventing end play of a rotatable element, comprising a supporting member, a non-rotatable thrust bearing element carried by said member and movable with respect thereto toward and away from said rotatable element, and a disc pack, means for moistening said pack, said pack being positioned between said member and the rear portion of said bearing element.

3. In a gyro compass, a casing, a gyro rotor mounted therein, a thrust bearing associated with each end of the shaft of said rotor, one element of each of said bearings being carried by said casing and movable with respect thereto, and a plurality of flat elements adapted to be moistened and positioned between one end of each of said bearing elements and a portion of said casing.

4. In combination, a rotatable shaft, a relatively fixed member, a non-rotatable thrust bearing associated with said shaft, a source of fluid supply, and an expanding device comprising a pack of thin discs positioned between said member and the rear portion of said bearing in communication with said fluid supply, the action of said fluid on said discs supplying the increased volume upon expansion of said device.

5. In combination, a rotatable bearing element, a non-rotatable bearing element cooperating therewith, a relatively fixed member, separating members independent of said fixed member comprising a plurality of thin discs positioned between said non-rotatable element and said fixed member, and liquid supply means associated with said separating members.

6. In gyroscopic apparatus, the combination with the gyro rotor, a support therefor, and means for mounting the same for oscillation about an axis at an angle to the rotor axis, of a plurality of disks for maintaining the centralization of said rotor relative to said support, and liquid supply means associated with said disks.

7. In gyroscopic apparatus, the combination with the gyro rotor, a support therefor, means for supporting said casing for oscillation about an axis at an angle to the rotor axis, of a plurality of disks for maintaining the centralization of said rotor relative to said support, and liquid supply means associated with said disks.

8. In combination, a rotatable shaft, a non-rotatable thrust bearing block associated therewith, a fixed part, a plurality of non-rotatable disks between said bearing and said part, and a reservoir, said disks extending into said reservoir whereby the spaces between said disks are filled by capillary action.

9. In combination, a rotatable shaft, a thrust bearing associated therewith, said bearing comprising a part rotatable with said shaft and a part movable axially but held against rotation, a fixed part, a plurality of non-rotatable disks between said second part and said fixed part, and a reservoir, said disks extending into said reservoir whereby the spaces between said disks are filled by capillary action.

In testimony whereof I have affixed my signature.

CHESTER B. MILLS.